March 24, 1964 N. A. CARTER, JR., ETAL 3,126,224
CONVERTIBLE TRAILER
Filed Jan. 22, 1962 4 Sheets-Sheet 1
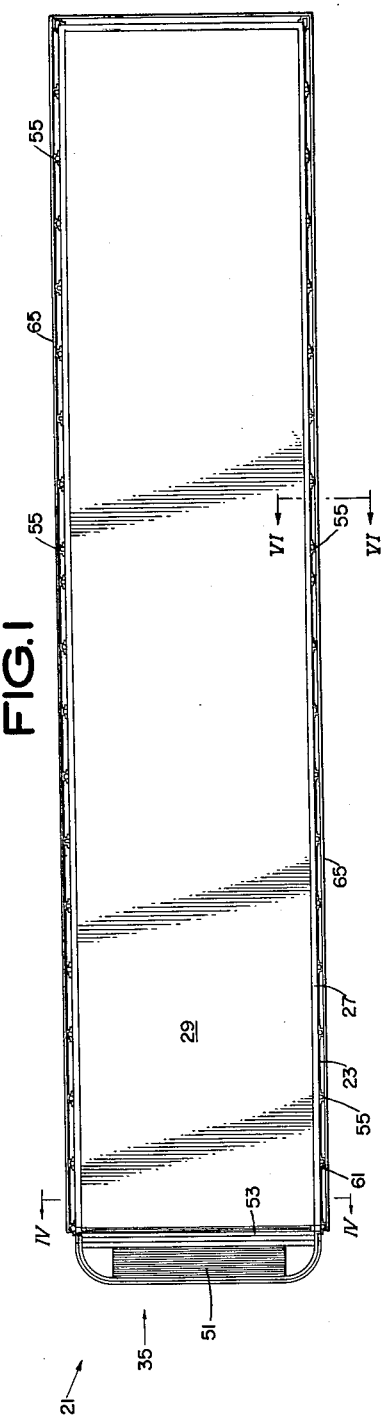
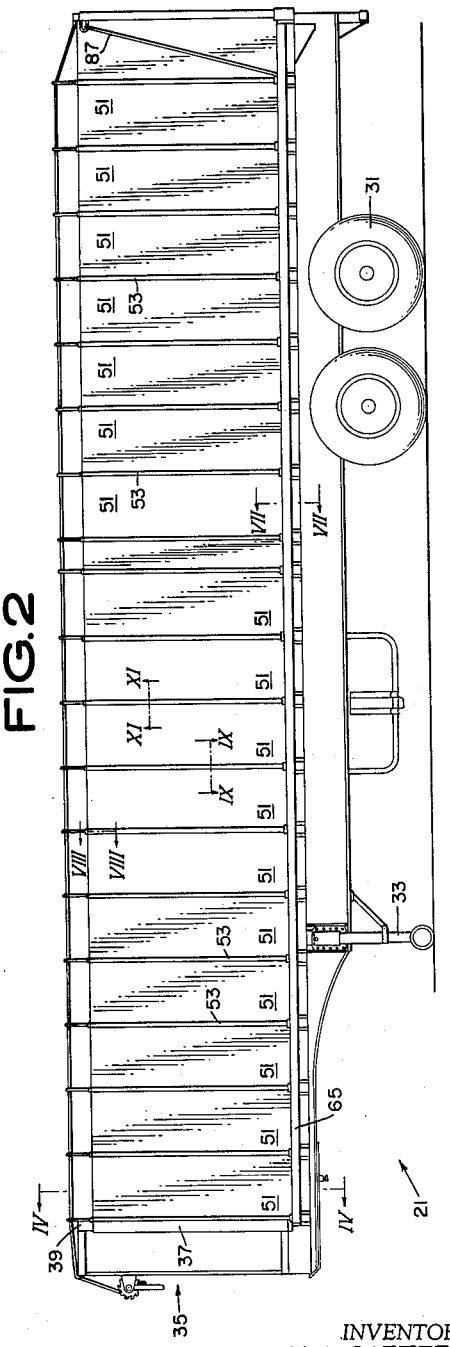
INVENTORS,
NATHAN A. CARTER, JR.
ROY S. JOHNSON March 24, 1964 N. A. CARTER, JR., ETAL 3,126,224
CONVERTIBLE TRAILER
Filed Jan. 22, 1962 4 Sheets-Sheet 2

INVENTORS,
NATHAN A. CARTER, JR.
ROY S. JOHNSON
BY

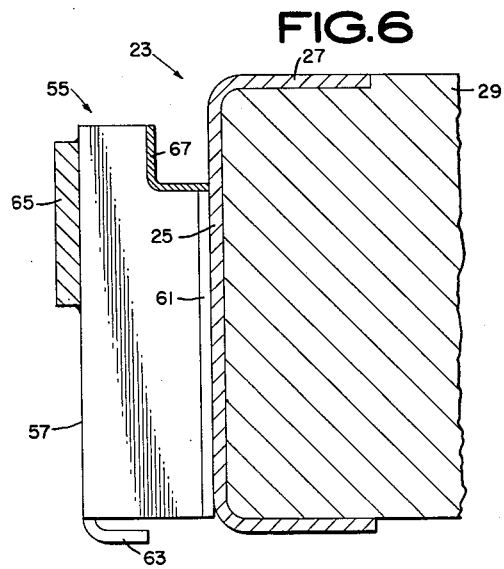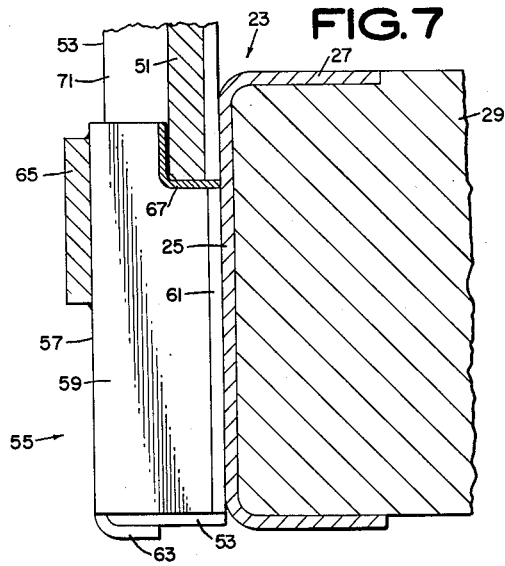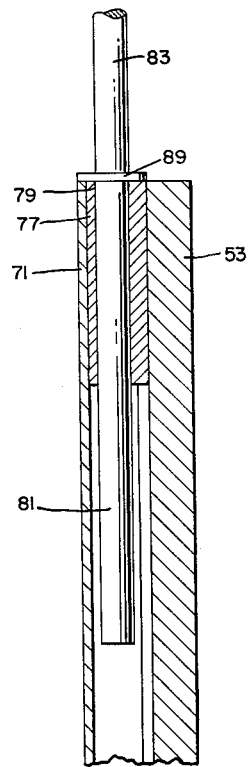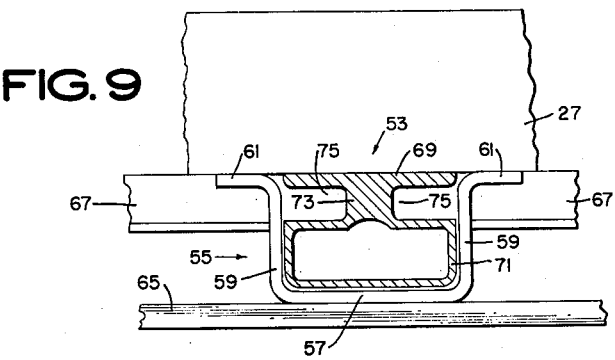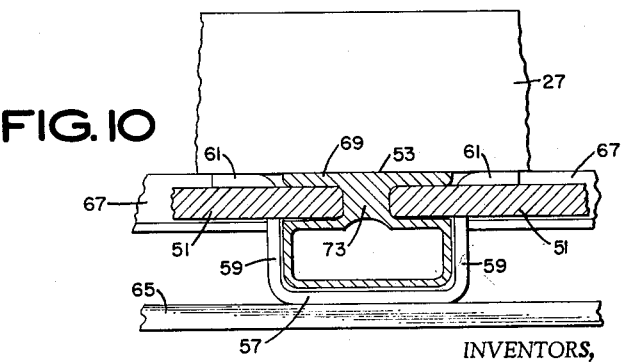

March 24, 1964   N. A. CARTER, JR., ETAL   3,126,224
CONVERTIBLE TRAILER
Filed Jan. 22, 1962   4 Sheets-Sheet 4
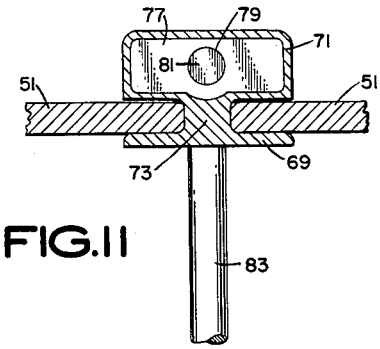
FIG.11
FIG.14
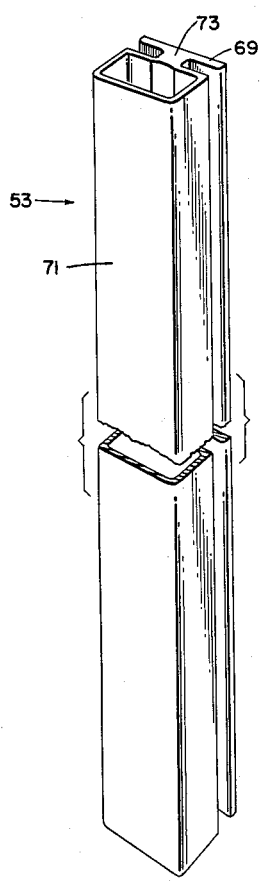
FIG.12
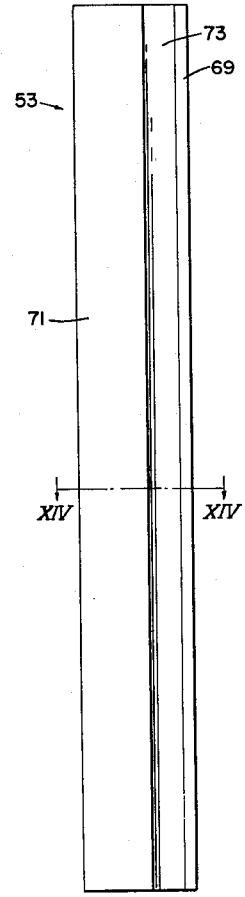
FIG.13
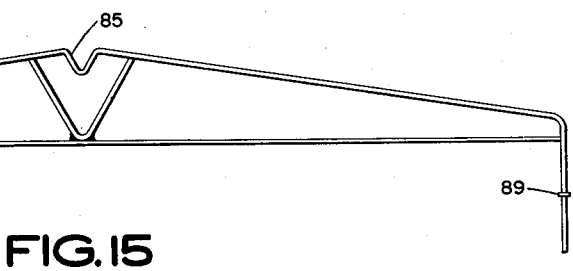
FIG.15
INVENTORS,
NATHAN A. CARTER, JR.
ROY S. JOHNSON
BY Weatherford & Weatherford
Attys

United States Patent Office 3,126,224
Patented Mar. 24, 1964

3,126,224
CONVERTIBLE TRAILER
Nathan A. Carter, Jr., and Roy S. Johnson, Memphis, Tenn., assignors to Arrow Equipment Company, Inc., Memphis, Tenn., a corporation of Tennessee
Filed Jan. 22, 1962, Ser. No. 167,814
5 Claims. (Cl. 296—28)

This invention relates to certain new and useful improvements in trailer bodies adapted particularly for highway use, and more particularly for trailer bodies which may be converted to and from a platform bed condition from and to an enclosed semi-van type condition.

It has heretofore been found desirable to provide for convertible trailer structures for highway use in order that a platform bed trailer may be provided for transportation along one part of a specific trip and the cargo therein discharged at the end of the part of the trip, and the trailer converted by the erection of sides and roof in order to house more fragile cargo for a return trip. Much difficulty has heretofore been encountered in seeking to provide for the ready means of conversion of trailers from platform condition to enclosed condition, and these problems have resulted in a number of bizarre arrangements which have proven to be difficult and unwieldy in handling, and which have not proved commercially successful. The present device is intended to provide a platform trailer together with means for erecting the side, end and roof enclosure for the platform trailer which means may conveniently be stowed upon the platform trailer when in platform bed condition, and which may readily be removed from the stowage for simple erection upon and in connection with the platform bed, quickly converting the platform into an enclosed trailer device.

It will be appreciated that while the present device is illustrated as used upon a so-called semi-trailer which is adapted to be drawn along the highway by a tractor unit, it may equally as well be used upon and in connection with a full trailer, and that other types of transportation and of transportable support may be utilized without departing from the invention herein.

The principal object of the present invention is to provide a convertible trailer having a substantially flat bed to which are fixed a plurality of post-receiving pockets of the design incorporated in the present invention, and which further includes panel-supporting brackets extending substantially along the sides of the bed of such trailer between the post-receiving pockets.

A further object of the invention is to provide such a convertible trailer device which includes a plurality of vertically disposed posts removably mounted in the aforesaid pockets, with each of the posts being provided along their vertical sides with grooves for the reception of lateral edges of the side panels.

A further object of the invention is to provide such a device in which side panels are removably mounted with the lateral edges of the panels engaged within the grooves of the aforesaid vertical posts, and with the lower edges of the panels supported upon the brackets interposed between the respective post-receiving pockets.

A further object of the invention is to provide such a trailer structure in which the post-receiving pockets extend substantially below the peripheral floor frame of the trailer and each of the pockets is provided with an in-turned flange for supporting a post inserted therein.

A further object of the invention is to provide such a device in which each of the respective posts is provided with a hollow interior vertically disposed outwardly of the vertical grooves for engaging the lateral edges of the side panels, and in the upper end of said vertical open interior a plug is fixed which includes a socket for detachably receiving the end of a tarpaulin bow.

A further object of the invention is to provide in conjunction with a trailer which includes posts insertably supported around the periphery of the floor frame of the trailer a plurality of tarpaulin supporting bows detachably connected with the upper ends of the said posts when erected.

A further object of the invention is to provide such a plurality of tarpaulin supporting bows in which the central part of each of said bows is provided with a depressed V-shaped portion adapted to receive a ridge cable extending longitudinally therealong and relative thereto.

A further object of the invention is to provide each of said bows with a socket entering portion for insertion into each of the sockets of the said posts and provided with a shoulder at the junction between the socket insertion portions and the main part of the bow in order to limit downward movement of the bow relative to the related said post; and A further object of the invention is generally to improve the design, construction and efficiency of trailer means adapted for conversion from platform type to enclosed type.

The means by which the foregoing and other objects of the present invention are accomplished and the manner of their accomplishment will be readily understood from the following specification upon reefrence to the accompanying drawings, in which:

FIG. 1 is a top plan view of the trailer construction of the present invention in platform condition.

FIG. 2 is a side elevational view of the trailer construction with the side enclosing and roof supporting means installed.

FIG. 3 is a top plan view of the device as seen in FIG. 2.

FIG. 4 is a vertical sectional view taken as on the line IV—IV of FIG. 1.

FIG. 5 is a rear end view of the device as seen in FIG. 3.

FIG. 6 is a fragmentary enlarged sectional view taken as on the line VI—VI of FIG. 1.

FIG. 7 is a view similar to FIG. 6 taken as on the line VII—VII of FIG. 2.

FIG. 8 is a fragmentary sectional view taken as on the line VIII—VIII of FIG. 2.

FIG. 9 is a fragmentary sectional plan view taken as on the line IX—IX of FIG. 2, with the side panels omitted therefrom.

FIG. 10 is a view similar to FIG. 9 with the panels shown fragmentarily in mounted condition.

FIG. 11 is a fragmentary inverted sectional plan view taken as on the line XI—XI of FIG. 2.

FIG. 12 is a perspective view of one of the posts of the preferred embodiment of the invention broken out for illustration.

FIG. 13 is a side view of the posts as shown in FIG. 12.

FIG. 14 is a cross sectional view taken through the post of FIGS. 12 and 13.

FIG. 15 is an elevational view of the tarpaulin supporting bow utilized in connection with the present invention.

Referring now to the drawings in which the various parts are indicated by numerals, the present device is essentially composed of a trailer platform adapted for movement from place to place, and upon which the additional features of the invention are mounted or may be fixed as desired.

Thus the device includes a trailer bed 21 defined by a peripheral frame 23, frame 23 extending along the sides and ends of the trailer bed and preferably being formed of a structural member such as a channel member as best indicated in FIGS. 6 and 7. Peripheral frame 23 includes an outwardly facing web 25, although other structural members may be utilized.

Spanning from side to side of trailer bed 21 is a suitable flooring 29. Trailer bed 21 is illustrated in a semi-trailer type of construction and is supported for transportation adjacent its rear end by suitable wheel trucks 31. For support when at rest the trailer bed is preferably provided adjacent its forward end with supports 33 which may be swung downwardly to supporting position when the trailer is disconnected from its tractor unit (not shown) and which may be retracted into a withdrawn position when the device is connected with such a tractor for transportation. Other accessories are connected to the underside of trailer bed 21 and are supported therefrom.

At the forward end of trailer bed 21 is rigidly mounted a nose section 35 which preferably is rigidly fixed to trailer bed 21, projects upwardly therefrom at the forward end thereof, and is provided with rounded corners for ease of use of the trailer structure. At the respective rearward ends of nose section 35 fixed posts 37 are mounted which are respectively adapted to receive and retain a top cross beam 39 extending transversely across the forward end of trailer bed 21 and being provided with means for the receception of bulkhead panels 41.

Each of bulkhead panels 41 is provided with a pair of elongated vertical stake members 43 which are rigidly fixed to the respective bulkhead panels 41, stake members 43 extending a minor distance below the lower edges of bulkhead panels 41 and a somewhat greater distance above the upper edges of the bulkhead panels. Cross beam 39 is provided with a plurality of holders 45 which are preferably formed as open channel members fixed to cross beam 39 and which are adapted to receive the upper ends of stake members 43.

At the lower ends of panel members 41 a sill member 47 is provided which is detachably connected to trailer bed 21. Preferably sill member 47 includes a plurality of receptacle openings 49 which are adapted to receive the lower ends of stake members 43. Thus panels 41 may have the upper ends of their respective stake members 43 inserted into holders 45 in cross beam 39 and moved upwardly until the lower ends of the stake members have cleared the sill 47 when the lower ends of the stakes may be moved downwardly thereinto.

Panels 41 preferably are of a height less than the distance between cross beam 39 and cross sill 47 in order to provide for the placing and replacing movement of the panels relative to cross beam 39 and sill 47. Thus when panels 41 are fully mounted in position transversely of the nose section of the trailer the upper edges of panels 41 are spaced somewhat below cross beam 39, with the upper ends of stake members 43 projecting thereabove into holders 45 and providing a vertical movement space therefor.

When so positioned bulkhead panels 41 establish a bulkhead closing off the forward nose position of the trailer and providing a storage section for the additional items which are used in conjunction with the conversion of the present device from a platform type trailer to an enclosed type trailer. These devices include a plurality of side panels 51 and a plurality of detachable and removable posts 53, which panels and posts may conveniently be stowed in the nose section awaiting such further usage as may be desired.

Spaced along the periphery of frame 23 and rigidly fixed to web 25 of frame 23 are a plurality of post receiving pockets 55 which are adapted to receive the lower ends of posts 53 and to retain the same therein. Each of pockets 55 comprises a substantially hat-shaped member in cross section which has an outer face 57, inwardly projecting sides 59, and longitudinally extending attachment portions 61. Attachment portions 61 are adapted to lie along web 25 of peripheral channel frame 23 and are rigidly secured thereto in order to secure pockets 55 to the frame.

Each of the outer faces 57 of pockets 55 extends downwardly below the lower end of the respective pockets and terminates in an inturned substantially horizontal seat flange 63 which underlies a substantial part of the open interior of the pocket and is adapted to provide a lower seat for items inserted into the pocket such as the respective posts 53. Preferably the flanges 63 are disposed at a level substantially equal to the level of the lowermost flange of bed frame 23.

Substantially coextensive in length with the sides of peripheral frame 23 is a rigid rub rail 65 which is preferably fixed to the respective outer faces 57 of pockets 55, and spans across the pockets, additionally interconnecting the same as well as providing a rub rail for the trailer structure.

The respective attachment portions 61 and sides 59 of pockets 55 are cut off somewhat below the height of the pocket so as to provide a rearwardly and sidewardly open notch in the sides of the respective pockets. Extending between adjacent pockets 55 are panel supporting brackets 67 which are rigidly fixed to web 25 of frame 23, and brackets 67 extend along frame 23 between the respective pockets. Each of the brackets 67 is upwardly open, being preferably formed of a substantially angle member, and the respective ends of brackets 67 abut against and are fixed to attachment portions 61 of pockets 55, and otherwise the brackets abut against and are rigidly fixed to sides 59 of pockets 55.

As above indicated, the sides of the pockets are cut out and this provides communication between the longitudinal interior of brackets 67 and the interior of the respective side pockets in order to afford engagement, as will hereinafter be described of the respective panels 51 when mounted in the device with the grooves of the respective posts 53. It will be observed that the lower and horizontal portions of the respective brackets 67 are disposed substantially below the level of floor 29 and somewhat below the upper level of pockets 55.

Each of posts 53 comprises an elongated member which is adapted to be removably placed in one of the pockets 55. Posts 53 each are of a substantially H-shape in cross section and are adapted to fit into pockets 55. One leg 69 of the H-shape is adapted to slidably extend downwardly along web 25 of frame 23 in substantial alinement with attachment portions 61 of pockets 55. The other leg 71 of the H-shape of the respective posts comprises a hollow member which extends from end to end of posts 53 comprising an enlarged leg with spaced apart portions. Legs 69, 71 are interconnected and spaced apart by a cross member 73, which in cross section is relatively narrow and provides a substantial space between legs 69, 71, defining grooves 75 which are substantially thick and which preferably extend vertically longitudinally along the respective posts 53 and provide deep panel receiving grooves adapted to receive the vertical side edges of panels 51 when the same are inserted into position.

It will be observed that each of posts 53 fits slidably and relatively snugly within one of the pockets 55, and that when post 53 is inserted into a pocket 55 the lower end of the post extends downwardly into engagement with inturned seat 63 of pocket 55, restraining the post from further downward movement, and thus permitting the post to be supported with its lower end substantially below the level of flooring 29.

At the upper end of each of the posts a cap or plug 77 is frictionally fitted into the open upper end of hollow leg 71, effecting closure of the leg, and thus of the upper end of the post. Each cap 77 is provided with a socket 79 which is adapted snugly to receive the downwardly extending end 81 of a tarpaulin bow 83. Preferably each tarpaulin bow 83 includes substantially at its midpoint a downwardly extending substantially V-shaped ridge trough 85.

In the use of the device it may be erected into platform condition in which the side panels 51 and posts 53 are stowed in the nose section, with bulkhead panels 41 removably mounted between cross beam 39 and sill 47. The bed of the trailer is thus left open for unimpeded use in transportation of desired types of cargo. When it is desired to convert the trailer from an open platform type to an enclosed type, bulkhead panels 41 may be removed from the nose section 35 and remounted at the rear of the trailer. When so mounted the bulkhead panels may suitably be braced to the trailer bed as by diagonal lines 87.

Posts 53 may then be removed from the nose section and respectively mounted in the pockets 55 with legs 69 of the posts in engagement with web 25 of frame 23. When so positioned the hollow legs 71 of the respective posts are outermost and grooves 75 of the respective posts are disposed in alinement with the open part of panel supporting brackets 67. With the posts so mounted panels 51 may then be mounted between the adjacent posts.

The lateral edges of panels 51 are fitted into the open grooves 75 of the posts. The corners of the lower edges of the panels rest upon and are supported by the cut out notches in the pockets, and in addition the intermediate parts of the lower edges of the respective panels seat into the panel supporting brackets 67. Thus in the event of the loss or omission of one or more brackets 67, adequate support is provided. It will be observed that when so mounted the lower ends of the posts have extended downwardly into pockets 55 until the lower ends of the posts are supported upon seats 63 of the respective pockets. With the posts and panels thus mounted bows 83 may then be connected into sockets 79 maintained in the upper ends of the respective posts.

It will be observed that the posts are arranged transversely of the trailer in substantial alinement. The respective bows 83 thus fit into the sockets on opposite sides of the trailer so as to extend substantially transversely across the body of the trailer. It further will be seen that when the bows have thus been inserted into the respective sockets of the posts the bows effectively provide an interconnection for the upper ends of opposed pairs of posts so as to hold the same in substantially vertical alinement and assist in the maintenance of the enclosure of the sides of the trailer as converted to a closed type trailer. Each of the bows includes adjacent extension 81 which fits into the socket a shoulder 89 which seats against the upper part of socket 79 so as to limit downward movement of the bow relative thereto.

When bows 83 have been positioned transversely of the trailer and properly mounted in the respective sockets 79 of the posts, the ridge troughs 85 are in substantial alinement longitudinally of the trailer. When thus positioned a suitable ridge cable 91 may be secured at one end, as at the rear end, to the upstanding panels and be extended along the ridge troughs 85 to the forward end of the trailer where it may be secured to a suitable windlass 93 mounted upon the forward surface of nose section 35.

With the device thus assembled, through the medium of windlass 93 ridge cable 91 may be tightened so as effectively to seat the bows into the respective posts and firmly to seat the posts into the respective pockets, thus providing a simple conversion of the trailer from a platform type to an enclosed type trailer. As can readily be observed the sides of the enclosed form of the trailer may simply be knocked down in order to reconvert the device to a platform type trailer.

It will further be seen that in view of the arrangement of the respective pockets by which the posts are supported relative to the trailer in enclosed condition the lower supporting flanges 63 terminate spaced outwardly away from the peripheral side frame 23 of the trailer and thus provide for drainage of any moisture that might accumulate in foul weather or the like. When the device has been erected in closed side condition, if desired a suitable roof such as of tarpaulin or the like may be mounted over the ridge cable and tarpaulin bows forming the upper part of the structure.

I claim:

1. In a trailer structure convertible to and from platform condition, from and to enclosed condition, a platform trailer bed having a peripheral frame, a plurality of spaced apart, post receiving pockets rigidly secured to said frame and being upwardly open, each said pocket adjacent its lower end including an inwardly extending seat flange disposed below the upper level of said bed, said pockets being disposed so that pairs of said pockets on opposite sides of said frame are transversely substantially alined; a plurality of posts in enclosed condition of said trailer removably seated in said pockets and on said seats, said posts being of substantially H-shape in cross section and including thereby a pair of laterally open vertical grooves extending substantially from end to end of said posts, panel means having their lateral edges removably mounted in and retained by said grooves; support brackets secured to said frame spanning between said pockets adjacent the upper level of said bed, the lower edges of said panel means resting in and supported by said brackets; said posts outwardly of said grooves including a hollow leg, a plug fitted into the upper end of each said hollow leg, said plugs having a socket, a plurality of tarpaulin supporting bows having opposite, reduced downwardly extending ends fitted into said sockets, said bows respectively spanning from side to side of said bed and engaging the sockets of transversely alined pairs of posts; means enclosing said bed fore and aft, ridge cable means secured to said fore and aft, ridge cable means secured to said fore and aft enclosure means, each said bow including a central substantially V-shaped portion, said cable extending longitudinally of said trailer through said V-shaped portions.

2. In a trailer structure convertible to and from platform condition, from and to enclosed condition, a platform trailer bed having a peripheral frame, a plurality of spaced apart, post receiving pockets rigidly secured to said frame and being upwardly open, each said pocket adjacent its lower end including an inwardly extending seat flange disposed below the upper level of said bed, said pockets being disposed so that pairs of said pockets on opposite sides of said frame are transversely substantially alined; a plurality of posts in enclosed condition of said trailer removably seated in said pockets and on said seats, said post including a pair of laterally open vertical grooves extending substantially from end to end of said posts, panel means having their lateral edges removably mounted in and retained by said grooves; support brackets secured to said frame spanning between said pockets adjacent the upper level of said bed, the lower edges of said panel means resting in and supported by said brackets; said posts outwardly of said grooves including a hollow leg, a plug fitted into the upper end of said hollow leg, and said plug having a socket, a plurality of tarpaulin supporting bows having opposite, reduced, downwardly extending ends fitted into said sockets, said bows respectively spanning from side to side of said bed and engaging the sockets of transversely alined pairs of posts.

3. In a trailer structure convertible to and from platform condition, from and to enclosed condition, a platform trailer bed having a peripheral frame, a plurality of spaced apart, post receiving pockets rigidly secured to said frame and being upwardly open, each said pocket adjacent its lower end including an inwardly extending seat flange disposed below the upper level of said bed, said pockets being disposed so that pairs of said pockets on opposite sides of said frame are transversely substantially alined; a plurality of posts in enclosed condition of said trailer removably seated in said pockets and on said seats, said posts including a pair of laterally open vertical grooves extending substantially from end to end of said posts, panel means having their lateral edges removably mounted in and retained by said grooves; said posts outwardly of said grooves including a hollow leg, a plug fitted into the upper end of said hollow leg, said plug having a socket, a plurality of tarpaulin supporting bows having opposite, reduced, downwardly extending ends fitted into said sockets, said bows respectively spanning from side to side of said bed and engaging the sockets of transversely alined pairs of posts.

4. In a trailer structure convertible to and from platform condition, from and to enclosed condition, a platform trailer bed having a peripheral frame, a plurality of spaced apart, post receiving pockets rigidly secured to said frame and being upwardly open, each said pocket adjacent its lower end including an inwardly extending seat flange disposed below the upper level of said bed, said pockets being disposed so that pairs of said pockets on opposite sides of said frame are transversely substantially alined; a plurality of posts in enclosed condition of said trailer removably seated in said pockets and on said seats, said posts including a pair of laterally open vertical grooves extending substantially from end to end of said posts, panel means having their lateral edges removably mounted in and retained by said grooves; means supporting the lower edges of said panel means, said posts outwardly of said grooves including a hollow leg, a plug fitted into the upper end of said hollow leg, said plug having a socket, a plurality of tarpaulin supporting bows having opposite, reduced, downwardly extending ends fitted into said sockets, said bows respectively spanning from side to side of said bed and engaging the sockets of transversely alined pairs of posts; means enclosing said bed fore and aft, ridge cable means secured to said fore and aft enclosure means, each said bow including a central substantially V-shaped portion, said cable extending longitudinally of said trailer through said V-shaped portions.

5. In a trailer structure convertible to and from platform condition, from and to enclosed condition, a platform trailer bed having a peripheral frame, a plurality of spaced apart, post receiving pockets rigidly secured to said frame and being upwardly open, each said pocket adjacent its lower end including an inwardly extending seat flange disposed below the upper level of said bed, said pockets being disposed so that pairs of said pockets on opposite sides of said frame are transversely substantially alined; a plurality of posts in enclosed condition of said trailer removably seated in said pockets and on said seats, said posts including a pair of laterally open vertical grooves extending substantially from end to end of said posts, panel means having their lateral edges removably mounted in and retained by said grooves; means supporting the lower edges of said panel means, said posts outwardly of said grooves including a hollow leg, a plug fitted into the upper end of said hollow leg, said plug having a socket, a plurality of tarpaulin supporting bows having opposite, reduced, downwardly extending ends fitted into said sockets, said bows respectively spanning from side to side of said bed and engaging the sockets of transversely alined pairs of posts.

References Cited in the file of this patent
UNITED STATES PATENTS

| | | |
|---|---|---|
| 623,042 | Selzer | Apr. 11, 1899 |
| 1,363,059 | Shanahan | Dec. 21, 1920 |
| 1,422,859 | Hewitt et al. | July 18, 1922 |
| 1,436,513 | Martin | Nov. 21, 1922 |
| 2,899,235 | Curtis et al. | Aug. 11, 1959 |
| 2,955,874 | Brindley | Oct. 11, 1960 |
| 3,010,755 | Black | Nov. 28, 1961 |
| 3,066,974 | Ambli | Dec. 4, 1962 |